United States Patent [19]
Burke

[11] 3,744,090
[45] July 10, 1973

[54] FISH-SUPPORTING AND HOLDING DEVICE

[76] Inventor: Robert C. Burke, 1103 Richard St., Miamisburg, Ohio 45342

[22] Filed: Dec. 7, 1970

[21] Appl. No.: 95,520

[52] U.S. Cl. .................................................. 17/70
[51] Int. Cl. ............................................. A22c 25/06
[58] Field of Search ........................................ 17/70

[56] References Cited
UNITED STATES PATENTS

| | | | |
|---|---|---|---|
| 2,725,592 | 12/1955 | Pieper | 17/70 |
| 3,445,885 | 5/1969 | Reitz | 17/70 |
| 3,248,751 | 5/1966 | Wilborn | 17/70 |
| 2,531,546 | 11/1950 | Anderson | 17/70 |
| 3,015,841 | 1/1962 | Reutz | 17/70 |

Primary Examiner—Lucie H. Laudenslager
Attorney—Irvin V. Gleim, Edward M. Tritle and Francis M. Crawford

[57] ABSTRACT

A table-like support member has fixed thereto an upstanding member with a second upstanding member movably mounted on the support member for reciprocable movement toward and away from the fixed upstanding member for holding the body of a fish in a vice-like manner during fish cleaning operations. Fish-clamping means are fixed to the support member and also to the fixed upstanding member. The support member includes a drawer for fish-cleaning implements.

4 Claims, 2 Drawing Figures

PATENTED JUL 10 1973 3,744,090

INVENTOR.
ROBERT C. BURKE
BY
Edward M. Title
Francis M. Crawford
Attorney

FISH-SUPPORTING AND HOLDING DEVICE

BACKGROUND

The present invention relates generally to the preparation of food and, more particularly, to structure for holding a fish in one or more positions during fish-cleaning operations.

The task of cleaning fish is both difficult and laborious primarily due to the wetness of the fish scales or bodies which are also covered with a layer of slime so that the fish are very slippery and difficult to hold. The fish-cleaning operation becomes even more difficult as it progresses as a result of deposits of scale and slime being transferred to the hands of the person cleaning the fish, and thus adding to the initial difficulties.

I am aware that various devices have been proposed heretofore which purport to hold a fish during cleaning operations, sometimes by subjecting the fish to oppositely directed tensile forces applied at opposite ends of the body of the fish and others which clamp the fish against a supporting surface. Such devices are subject to certain disadvantages that arise particularly when various sizes and kinds of fish are to be cleaned, particularly since certain kinds of fish require cleaning in a different manner.

It is desirable to hold and support a fish in a horizontal plane for certain operations such as the removal of the scales, and it is also desirable to hold and support the fish in a vertical plane during other operations such as filleting. None of the devices proposed heretofore of which I am aware are capable of holding and supporting a fish in more than one position in connection with fish-cleaning operations.

SUMMARY

Accordingly, a principal object of the present invention is to provide improved means for obviating such difficulties. This is accomplished in accordance with the present invention by providing a support member having more than one support surface with fish-holding means associated with each of said surfaces which are angularly disposed relative to one another.

DESCRIPTION

Other objects and advantages will become apparent from the following description taken in connection with the accompanying drawings, in which.

Figure 1:
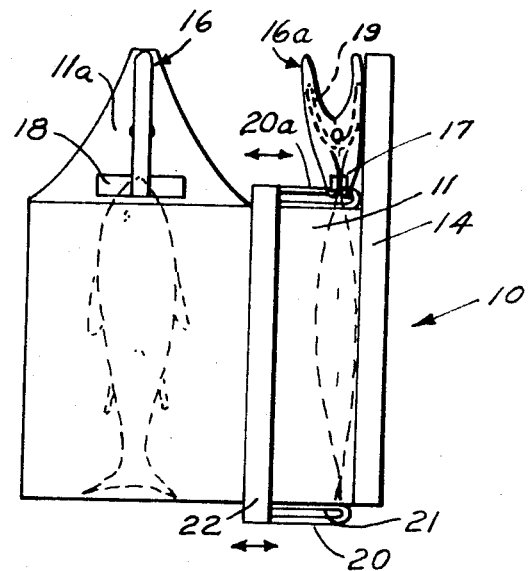
FIG. 1 is a plan view of a device embodying the present invention.
Figure 2:
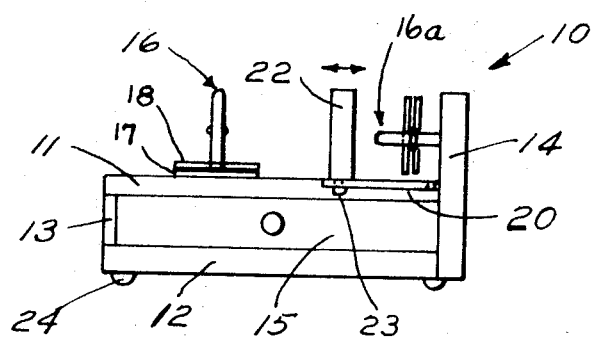
FIG. 2 is an end elevation of the device of FIG. 1.

In FIGS. 1 and 2 there is illustrated a presently preferred embodiment of the device indicated generally at 10 and includes upper and lower support members 11, 12 which are joined to side members 13, 14, thus enclosing a drawer 15.

As is best shown in FIG. 1, upper support member 11 includes an end portion 11a. Similarly, side portion 14 extends upwardly beyond the upper edge of support member 11, as shown in FIG. 1. And, as best shown in FIG. 2, side portion 14 extends upwardly above the surface of upper support member 11. A clamping means, indicated generally at 16 is fixed to end portion 11a, and a like clamping means 16a is fixed to the upper end portion of side portion 14. Each of the clamping means 16 include a pair of jaws 17, 18 and spring biasing means 19 urging the jaws 17, 18 to their closed position as shown in the drawings.

Slotted track members 20, 20a are connected to support member 11 along the upper and lower edges thereof as shown in FIG. 1 with slotted portion 21 thereof extending parallel to the upper and lower edges of the support member 11.

An upstanding member 22 is movably mounted on the support member 11 for reciprocable movement toward and away from side portion 14 by threaded fastening means 23 extending through slotted portions 21 which permit and at the same time guide such movement.

The entire device 10 may be supported by support feet 24 of any suitable material. If desired, support feed 24 may be of the suction cup type to provide added resistance to slipping.

It is believed that use and operation of the device will be apparent from the foregoing description.

Fish cleaning implements such as scalers, knives, and the like can be stored in drawer 15 until it is desired to make use of the device. When the device is to be used in connection with fish-cleaning operations, a fish is secured by one of the clamp means 16 and is held thereby while the fish-cleaning operation is carried out.

Pressure is first applied to the uppermost portion of one of the clamp means to compress the spring means 19 and open jaws 17, 18 so that an end portion of the fish can be inserted therebetween. Upon release of such pressure, the spring urges the jaws toward their closed position thus securely holding the fish. In this connection, the mating surfaces of jaws 17, 18 may be serrated, if desired, to enhance the holding action of the jaws and thus ensure that the fish will remain in the desired position during the subsequent cleaning operations. For example, if the operation to be performed is one involving scale removal, it may be desirable to have the fish body supported in a horizontal position by the upper support member 11, in which case the left hand clamp means 16 will be employed to hold the fish in this position. It will be understood that either the head and/or tail end of the fish may be secured by the clamping means. If the fish is of the type, such as a catfish, which requires skinning, it may be desirable to hold the fish by the head end whereas in other types of cleaning operations it may be more desirable to hold the fish by the tail end.

In still other types of cleaning operations, such as filleting, it may be desirable to hold the body portion of the fish in an upright position. In such case, the fish is held by the jaws of the clamping means that is fixed to side member 14 and the body of the fish is held in an upright position by exerting hand pressure against member 22 and moving it toward member 14, thereby holding the fish body in a vice-like grip while the other hand of the person performing the fish-cleaning operation is left free to do so. Upon completion of a fish-cleaning operation, the fish is released by again compressing the spring 19 and opening jaws 17, 18 to permit removal of the fish, and the device is then ready for a subsequent operation.

While a particular embodiment of the invention has been illustrated and described, it will be obvious that various changes and modifications can be made without departing from the invention, and it is intended in the appended claims to cover all such changes and modifications that fall within the true spirit and scope of the invention.

What is claimed is:

1. A device for supporting and holding fish of various sizes and kinds during fish-cleaning operations comprising
   a support member,
   an upstanding member fixed to said support member,
   clamping means fixed to said upstanding member adjacent one end thereof and including a pair of relatively movable jaws biased to closed position thereof releasably engaging one end of a fish when said end is positioned between said jaws,
   a second upstanding member movably mounted on said support member for reciprocable movement toward and away from said fixed upstanding member and releasably gripping exterior surfaces of a fish body between said upstanding members when said body is positioned therebetween and said second member is urged toward said fixed upstanding member, and
   track means connected to said support member and guiding said second member during said movement thereof.

2. Device according to claim 1 and additionally including second releasable fish-clamping means fixed to said support member.

3. Device according to claim 1 wherein said support member additionally includes slidably mounted thereon an implement-receivable receptacle.

4. Device according to claim 1 wherein said support member additionally includes fixed thereto slip-resisting support means.

* * * * *